(12) United States Patent
Akhtar et al.

(10) Patent No.: US 8,660,602 B2
(45) Date of Patent: Feb. 25, 2014

(54) INTELLIGENT COMMUNICATION WITH CONTACT LISTS

(75) Inventors: Haseeb Akhtar, Garland, TX (US); Vishwamitra Nandlall, McKinney, TX (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 13/609,884

(22) Filed: Sep. 11, 2012

(65) Prior Publication Data

US 2013/0102290 A1 Apr. 25, 2013

Related U.S. Application Data

(60) Provisional application No. 61/549,039, filed on Oct. 19, 2011.

(51) Int. Cl.
*H04M 1/00* (2006.01)
(52) U.S. Cl.
USPC .............. 455/550.1; 455/418; 455/412.1; 709/201

(58) Field of Classification Search
USPC .............. 455/550.1, 418, 412.1; 709/201
See application file for complete search history.

(56) References Cited

U.S. PATENT DOCUMENTS

| | | | |
|---|---|---|---|
| 7,283,831 B2 * | 10/2007 | Caldini et al. ............... | 455/466 |
| 7,886,000 B1 * | 2/2011 | Polis et al. ................... | 709/203 |
| 8,374,996 B2 * | 2/2013 | Strumpf et al. .............. | 707/603 |
| 2005/0272020 A1 * | 12/2005 | McGregor et al. ........... | 434/247 |
| 2009/0144201 A1 * | 6/2009 | Gierkink et al. ............. | 705/64 |
| 2010/0174748 A1 * | 7/2010 | Strumpf et al. .............. | 707/780 |
| 2010/0306249 A1 * | 12/2010 | Hill et al. ..................... | 707/769 |
| 2011/0078332 A1 * | 3/2011 | Poon ............................ | 709/248 |
| 2011/0256889 A1 * | 10/2011 | Polis et al. ................. | 455/456.3 |
| 2011/0269506 A1 * | 11/2011 | Choi et al. ................... | 455/566 |

* cited by examiner

*Primary Examiner* — Danh Le

(57) ABSTRACT

A telecommunication device (e.g., mobile phone, smart phone, tablet, laptop computer, personal computer) and method are described herein that utilize multiple communication applications (e.g., phone call, SMS, email, social networking applications (e.g., Facebook, Twitter, LinkedIn ... )) and a smart address book device (e.g., master contact list, user approved contact lists) to enable a user to send a communication event (e.g., voice call, SMS, email, social networking communication, multimedia session, web based real time communication session) to one or more recipients.

22 Claims, 7 Drawing Sheets

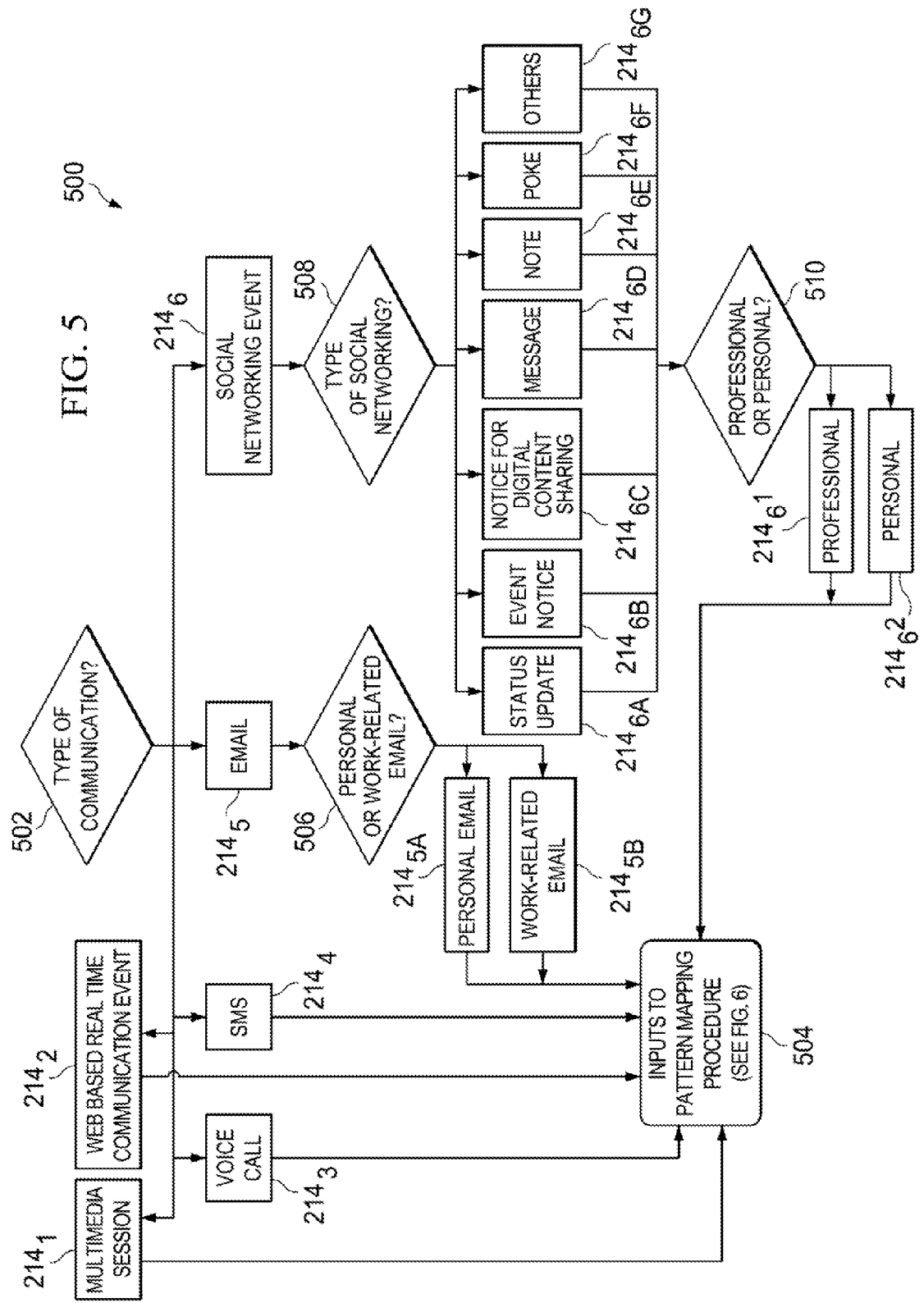

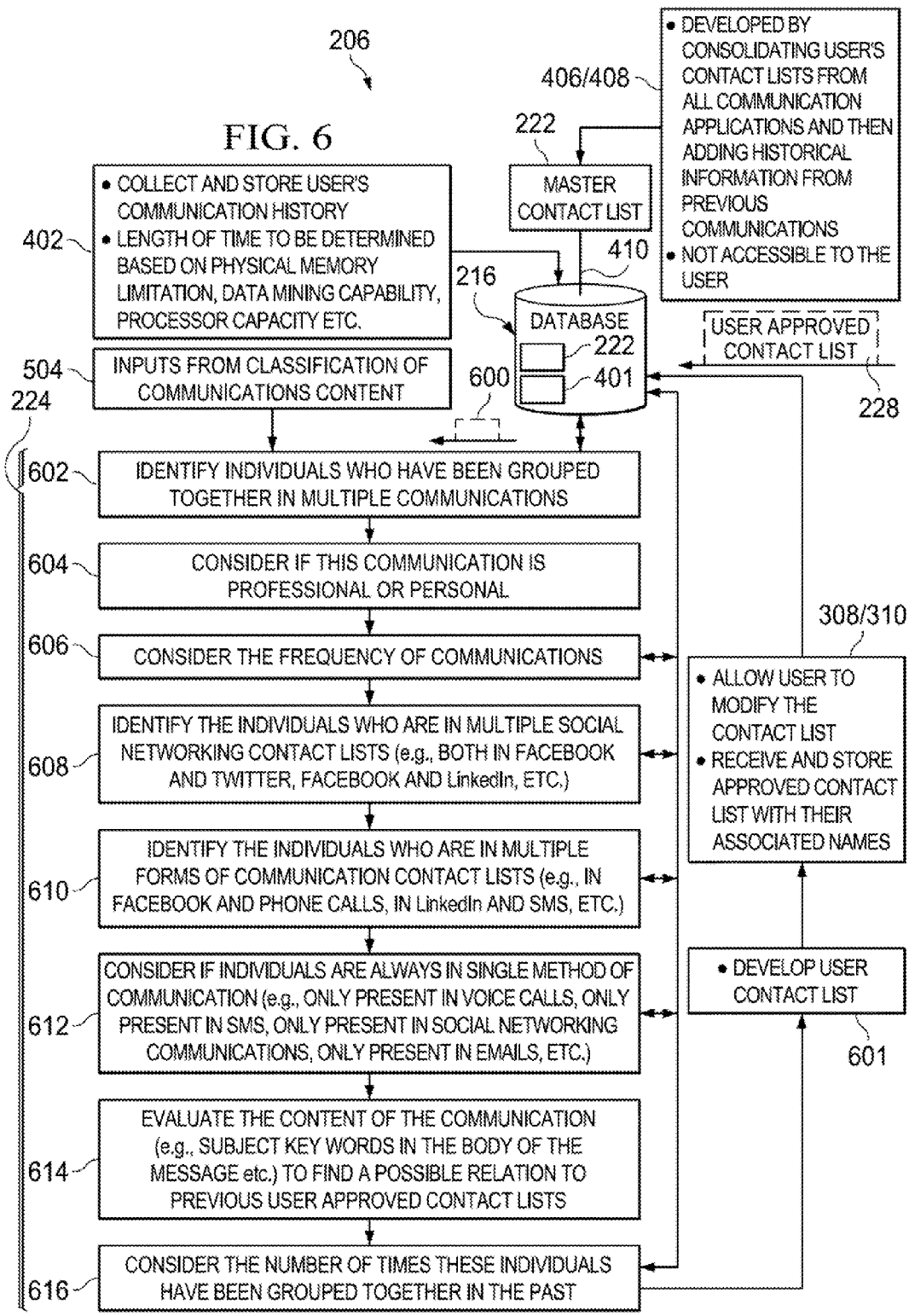

INTELLIGENT COMMUNICATION WITH CONTACT LISTS

CLAIM OF PRIORITY

This application claims the benefit of U.S. Provisional Application Ser. No. 61/549,039 filed on Oct. 19, 2011. The contents of this document are hereby incorporated by reference herein.

TECHNICAL FIELD

The present invention relates to a telecommunication device (e.g., mobile phone, smart phone, tablet, laptop computer, personal computer) and method for utilizing multiple communication applications (e.g., phone call. SMS, email, social networking applications (e.g., Facebook, Twitter, LinkedIn . . . )) and a smart address book device (e.g., master) contact list, user approved contact lists) to enable as user to send a communication event (e.g., voice call, SMS, email, social networking communication, multimedia session, web based real time communication session) to one or more recipients.

BACKGROUND

Managing contact list is one of the challenges of today that spans across the users of basic voice communication, SMS, email, social networking portals etc. . . . A new tool recently developed at Stanford University attempts to address this problem by automatically working out a person's different and overlapping friendship groups by analyzing the history of their Facebook and Gmail account. The tool—called Social-Flows—can work from the images a person was tagged in over the last two years, and from the pattern of e-mail recipients recorded in the last two years via a Gmail account. Once Socialflows has processed the necessary data, it suggests different groups of contacts or friends, some overlapping. Referring to FIG. 1 (PRIOR ART), there is a diagram which illustrates the basic concept of the SocialFlows tool where images tagged over last two years 100 and email recipients over last two years 102 are used to identify patterns 104, show overlaps 106, suggest contact groups 108, allow a user to edit 110, and store contact groups in Facebook or Gmail 112.

The SocialFlows tool does do a good job of taming the complexities of creating contact lists of different types of friends by analyzing the user's communication history associated with their Facebook and Gmail accounts. However, there is still a desire to improve on how contact lists can be created by analyzing the user's communication history from multiple communication applications. Furthermore, the SocialFlows tool does not control how to the user can communicate and send their message to the people in these contact lists, which can be much more complex when compared to the process of creating the contact lists of different types of friends. Hence, there is a desire to improve not only how contact lists can be created but also control how a user can communicate and send their message to the people in these contact lists.

SUMMARY

A telecommunication device, a method, and a smart address book device that address the aforementioned problems by improving how contact lists can be created and by controlling how a user can communicate and send their message to the people in these contact lists are described in the independent claims of the present application. Advantageous embodiments of the telecommunication device, the method, and the smart address book device have been described in the dependent claims of the present application.

In one aspect, the present invention provides a telecommunication device used by a user to initiate communication events to one or more recipients. The telecommunication device comprises a plurality of communication applications and a smart address book device. The smart address book device comprises as database, a processor; and a memory that stores processor-executable instructions. The processor interfaces with the memory and executes the processor-executable instructions to enable the following operations: (1) create a master contact list; (2) receive an indication that the user initiated a new communication event; (3) classify the new communication event; (4) run a pattern mapping procedure to identify patterns between the classified new communication event and the master contact list and then create a user contact list of potential recipients which could be sent the new communication event; (5) present the user contact list to the user and allow the user to modify the user contact list and generate a user approved contract list of one or more recipients that are to be sent the new communication event; (6) receive the user approved contact list; and (7) send the new communication event using one or more of the communication applications to the one or more recipients within the user approved contact list. The telecommunication device has an advantage in that it allows the user to communicate to a group of recipients that span across their multiple contact lists associated with multiple communication applications.

In another aspect, the present invention provides a method implemented by a telecommunication device used by a user to initiate communication events to one or more recipients. The telecommunication device includes a plurality of communication applications. The method comprises the steps of (1) creating a master contact list; (2) receiving an indication that the user initiated a new communication event; (3) classifying the new communication event; (4) running a pattern mapping procedure to identify patterns between the classified new communication event and the master contact list and then create a user contact list of potential recipients which could be sent the new communication event; (5) presenting the user contact list to the user and allows the user to modify the user contact list and generate a user approved contract list of one or more recipients that are to be sent the new communication event; (6) receiving the user approved contact list; and (7) sending the new communication event using one or more of the communication applications to the one or more recipients within the user approved contact list. The method has an advantage in that it allows the user to communicate to a group of recipients that span across their multiple contact lists associated with multiple communication applications.

In yet another aspect, the present invention provides a smart address book device configured to interact with a plurality of communication applications and further configured to manage one or more contact lists for a user. The smart address book device comprises a database, a processor; and a memory that stores processor-executable instructions. The processor interfaces with the memory and executes the processor-executable instructions to enable the following operations: (1) create a master contact list; (2) receive an indication that the user initiated a new communication event; (3) classify the new communication event; (4) run it pattern mapping procedure to identify patterns between the classified new communication event and a master contact list and then create a user contact list, of potential recipients which could be sent the new communication event; (5) present the user contact list to the user and allow the user to modify the user contact list and generate a user approved contract list of one or more recipients that are to be sent the new communication event (6) receive the user approved contact list; and (7) send the new communication event using one or more of the communication applications to the one or more recipients within the user approved contact list. The smart address book device has an advantage in that it allows the user to communicate to a group of recipients that span across their multiple contact lists associated with multiple communication applications.

In still yet another aspect, the present invention provides a smart address book device configured to interact with a plurality of communication applications and further configured to manage one or more contact lists for a user. The smart address book device comprises a database, a processor; and a memory that stores processor-executable instructions. The processor interfaces with the memory and executes the processor-executable instructions to enable the following operations: (1) collect a user communication history associated with the plurality of communication applications; (2) store the collected user communication history in the database; (3) create a master contact list; and (4) store the master contact list in the database. The smart address book device can create the master contact list by: (i) creating an integrated contact list by using the stored user communication history; and (ii) adding historical information retrieved from the stored user communication history to the integrated contact list to create the master contact list. The integrated contact list comprises a contact list indicating one or more recipients who are only associated with one of the communication applications, one or more recipients who are associated with two of the communication applications, and one or more recipients who are associated with three of the communication applications etc. . . . The smart address book device has an advantage in that it allows the user to communicate to a group of recipients that span across their multiple contact lists associated with multiple communication applications.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 5 is a flowchart of an exemplary method that can be implemented by the telecommunication device to classify a new communication event pursuant to a step in the method shown in FIG. 3 in accordance with an embodiment of the present invention;

FIG. 6 is a diagram illustrating various features of the telecommunication devices smart address book device which is used to help explain an exemplary pattern mapping procedure pursuant to a step in the method shown in FIG. 3 in accordance with an embodiment of the present invention.

DETAILED DESCRIPTION

Figure 2:
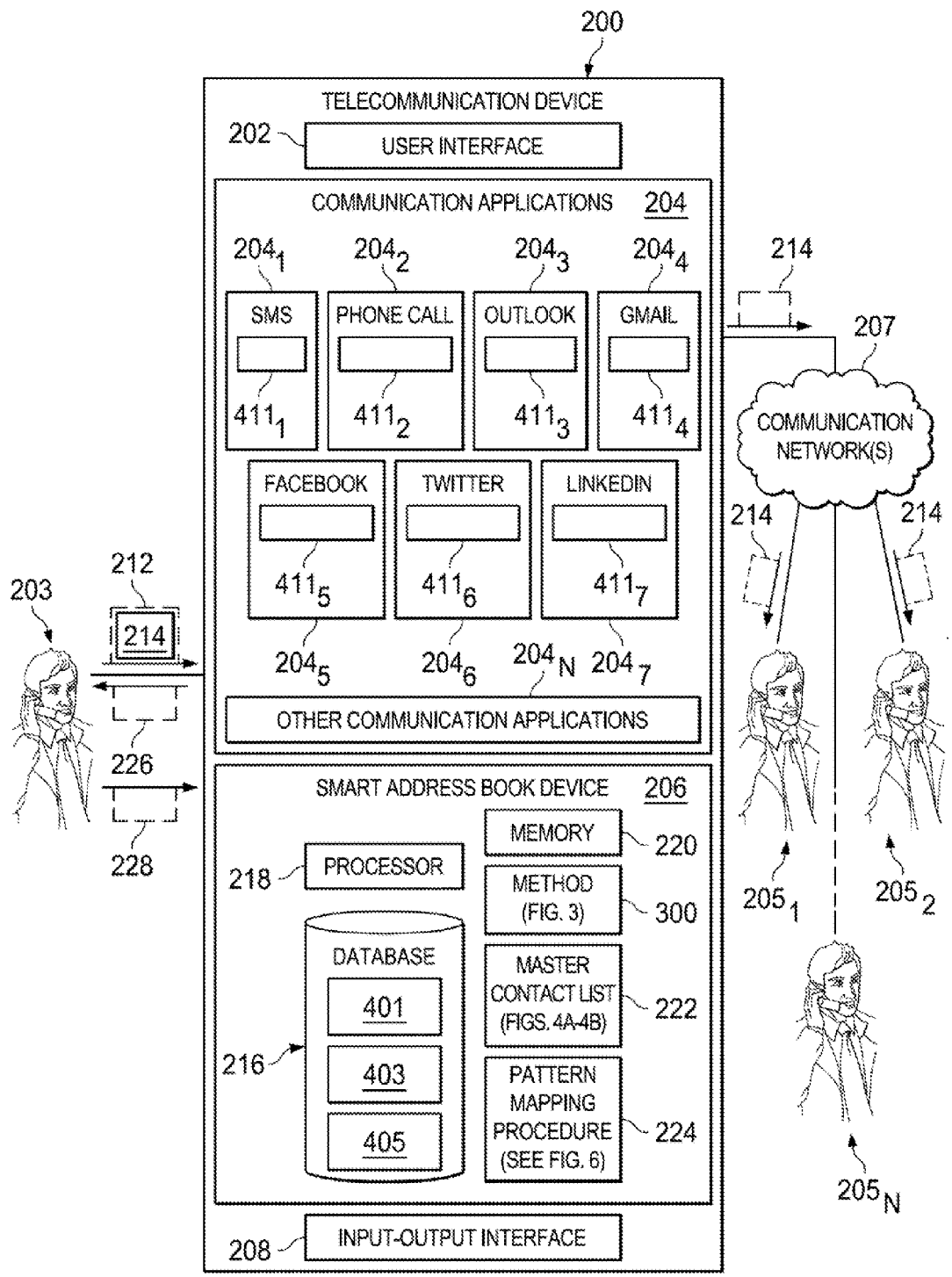
FIG. 2 is a diagram illustrating the basic components of a telecommunication device configured in accordance with an embodiment of the present invention.
Figure 3:
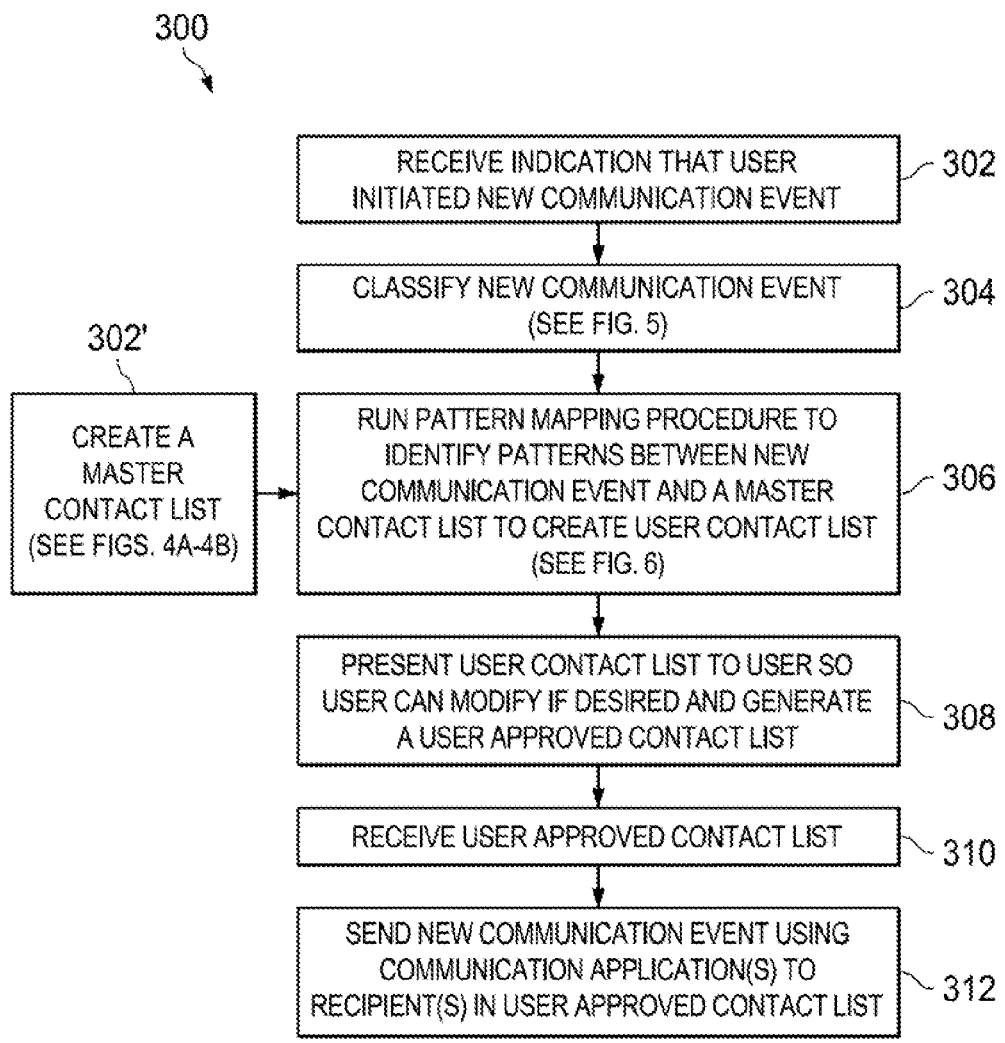
FIG. 3 is a flowchart illustrating an exemplary method which is implemented by the telecommunication device to initiate a communications event to one or more recipients in accordance with an embodiment of the present invention.

Referring to FIGS. 2-3, there are respectively shown as diagram of a telecommunication device 200 and a flowchart of a method 300 in accordance with an embodiment of the present invention. As shown in FIG. 2, the telecommunication device 200 includes a user interface 202, multiple communication applications $204_1$, $204_2$, $204_3$, $204_4$, $204_5$, $204_6$, $204_7$ . . . $204_n$, a smart address book device 206, and an input-output interface 208 (which enables communications with one or more communication networks 207). The telecommunication device 200 can be any type of device that a person 203 can use to send/receive communications to/from one or more people $205_1$, $205_2$ . . . $205_n$ via the communication network(s) 207. For instance, the telecommunication device 200 can be an enhanced mobile phone, smart phone, tablet, laptop computer, or personal computer. Plus, the telecommunication device 200 includes multiple communication applications $204_1$, $204_2$, $204_3$, $204_4$, $204_5$, $204_6$, $204_7$ . . . $204_n$ that the person 203 can use to send communications to one or more people $205_1$, $205_2$ . . . $205_n$ via the communication network 207. For instance, the communication applications $204_1$, $204_2$, $204_3$, $204_4$, $204_5$, $204_6$, $204_7$ . . . $204_n$ can include a SMS application $204_1$, a phone call application $204_2$, an Outlook email application $204_3$, a Gmail application $204_4$, a Facebook application $204_5$, a Twitter application $204_6$, a LinkedIn application $204_7$ and other communication applications $204_n$. The person skilled in the art will appreciate that the telecommunication device 200 includes many other well known components but for clarity only the components and functionalities which are needed to explain the present invention have been described in detail herein. In this regard, the smart address book device 206 is described, in detail below to explain how it addresses the aforementioned problems associated with the state-of-the-art by improving how contact lists 222, 226 and 228 can be created and by controlling how the user 203 can communicate and send a message 214 to one or more recipients $205_1$, $205_2$ (for example) in these contact lists 222, 226 and 228.

The smart address book device 206 includes a database 216, a processor 218, and a memory 220. The processor 218 interfaces with the memory 220 which stores processor-executable, instructions and executes the processor-executable instructions to perform method 300's steps as discussed next. At step 302', the smart address book device 206 creates a master contact list 222 (see FIGS. 4A-4B—note step 302' is performed continuously and independent of steps 302, 304 . . . 312). At step 302, the smart address book device 206 receives an indication 212 that the user 203 initiated a new communication event 214. At step 304, the smart address book device 206 classifies the new communication event 214. For instance, the new communication event 214 can be classified to be a multimedia session $214_1$, a web based real time communication session $214_2$, voice call $214_3$, a short message service $214_4$, an email $214_5$ (personal email, business email), or a social networking event $214_6$ (personal, business)

(see FIG. 5). At step 306, the smart address book device 206 runs a pattern mapping procedure 224 to identify patterns between the classified new communication event 214 and the master contact list 222 and then creates a user contact list 228 (see. FIG. 6) of potential recipients $205_1, 205_2 \ldots, 205_n$, which could be sent the new communication event 214. At step 308, the smart address book device 206 presents the user contact list 226 to the user and allows the user 203 to modify the user contact list 226 and generate a user approved contract list 228 of one or more recipients $205_1$ and $205_2$ (for example) that are to be sent the new communication event 214. At step 310, the smart address book device 206 receives the user approved contact list 228. At step 312, the smart address book device 206 sends the new communication event 214 using one or more of the communication applications $204_1, 204_2, 204_3, 204_4, 204_5, 204_6, 204_7 \ldots 204_n$ to the one or more recipients $205_1$ and $205_2$ (for example) within the user approved contact list 228. A detailed discussion is provided next about several exemplary ways that the smart address book device 206 can create the master contact list 222 (step 302'), classify the new communication event 214 (step 304), and run the pattern mapping procedure 224 (step 308).

Figure 4A:
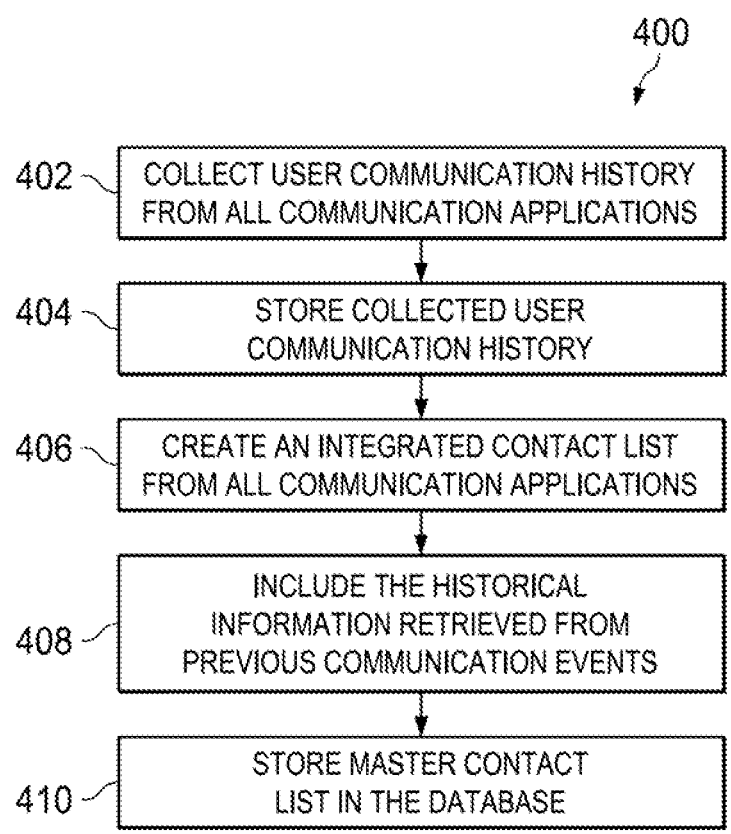
FIGS. 4A-4B are diagrams used to help explain how the telecommunication device creates a master contact list pursuant to a step in the method shown in FIG. 3 in accordance with an embodiment of the present invention.

Refining to FIG. 4A, there is a flowchart of an exemplary method 400 that can be used to create the master contact list 222 per method 300's step 302' in accordance with an embodiment of the present invention. At step 402, the smart address book device 206 collects a user's communication history 401 associated with the communication applications $204_1, 204_2, 204_3, 204_4, 204_5, 204_6, 204_7 \ldots 204_n$. At step 404, the smart address book device 206 stores the collected user's communication history 401 in the database 216 (see FIG. 6). The length of time that the user's communication history 401 is to be collected and stored depends on the telecommunication device's physical memory limitation, data mining capabilities, processor capability etc. . . . At step 406 the smart address book device 206 creates an integrated contact list 403 by using the stored user communication history 401 (see FIG. 4B). At step 408, the smart address book device 206 adds historical information 405 retrieved from the stored user communication history 401 to the integrated contact list 403 to create the master contact list 222 (see FIG. 4B). At step 410, the smart address book device 206 stores the master contact list 222 in the database 216 as shown in FIG. 6 (note: the user 203 does not have access to the master contact list 222). A more detailed discussion about the creation of the master contact list 222 is provided next with respect to FIG. 4B.

Figure 4B:
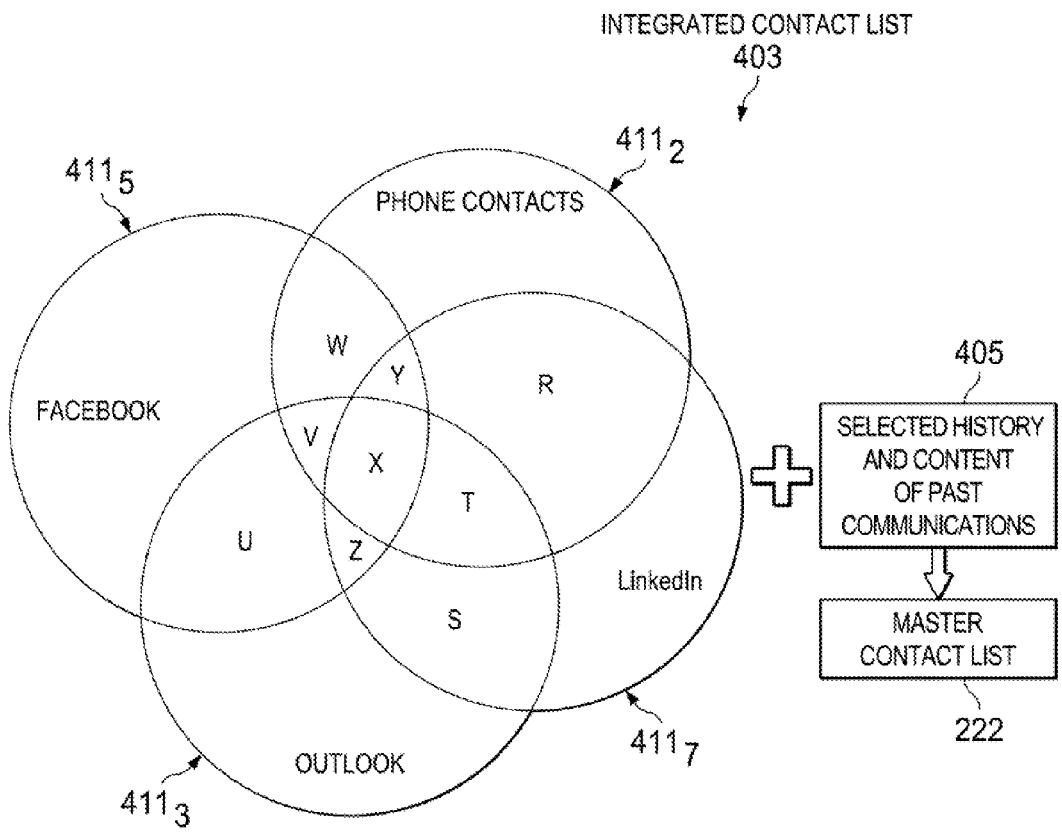

As shown in FIG. 4B, the smart address book device 206 creates the integrated contact list 403 by assimilating each contact list $411_1, 411_2, 411_3, 411_4, 411_5, 411_6, 411_7 \ldots 411_n$ from each of the communications applications $204_1, 204_2, 204_3, 204_4, 204_5, 204_6, 204_7 \ldots 204_n$—such as Facebook, Twitter, LinkedIn, Outlook, Gmail, phone contacts etc. . . . together. For clarity, in the illustrated example only the contact lists $411_2, 411_3, 411_3, 411_4, 411_5$ and $411_7$ associated with the phone call application $204_2$, the outlook email application $204_3$, the Facebook application $204_5$, and the Linker application $204_7$ have been shown. In general, the integrated contact list 403 indicates one or more recipients who are only associated with one of the communication applications, one or more recipients who are associated with two of the communication applications, and one or more recipients who are associated with three of the communication applications etc. . . . In the illustrated example, the integrated contact list 403 would indicate the following:

R—persons listed in Phone Contacts $411_2$ and LinkedIn $411_7$.

S—persons listed in LinkedIn $411_7$ and Outlook $411_3$.

T—persons listed in Outlook $411_3$, LinkedIn $411_7$ and Phone Contacts $411_2$.

U—persons listed in Facebook $411_5$ and Outlook $411_3$.

V—persons listed in Facebook $411_5$, Outlook $411_3$ and Phone Contacts $411_2$.

W—persons listed in Facebook $411_5$ and Phone Contacts $411_2$.

X—persons listed in Facebook $411_5$, Outlook $411_3$, LinkedIn $411_7$ and Phone Contacts $411_2$.

Y—persons listed in Facebook $411_5$, LinkedIn $411_7$ and Phone Contacts $411_2$, Z—persons listed in Facebook $411_5$, Outlook $411_3$ and LinkedIn $411_7$.

Thereafter, the smart address book device 206 adds historical information 405 selected from the user communication history 401 to the integrated contact list 403 to complete the development of the master contact list 222. The master contact list 222 is then stored in the database 216. The following selected historical information 405 of the user communication history 401 are some examples of how the user's communication history 401 can be utilized to create the master contact list 222:

People from different and disparate communication applications $204_1, 204_2, 204_3, 204_4, 204_5, 204_6, 204_7 \ldots 204_n$ that have been addressed together in one or more communication events. Stated another way, a list of recipients who are associated with different communication applications $204_1, 204_2, 204_3, 204_4, 204_5, 204_6, 204_7 \ldots 204_n$ and have been addressed together in one or more communication events. For example: user A from Facebook $411_5$ and user B from LinkedIn $411_7$ have been addressed in multiple emails.

The content of a communication that is of similar nature but addressed to people who belong to contact lists from different communication applications $204_1, 204_2, 204_3, 204_4, 204_5, 204_6, 204_7 \ldots 204_n$. Stated another way, a content of a similar nature which has been in multiple communication events that have been addressed to one or more recipients associated with one of the communication applications $204_1, 204_2, 204_3, 204_4, 204_5, 204_6, 204_7 \ldots 204_n$ and to one or more recipients associated with another one of the communication applications $204_1, 204_2, 204_3, 204_4, 204_5, 204_6, 204_7 \ldots 204_n$. For example: same birthday pictures have been sent over email to user C from Outlook $411_3$ and user D from Gmail $411_4$.

The persons from different contact lists who have been part of various communication events of similar nature. Stated another way, a list of recipients from different user approved contact lists who have been part of similar communication events. For example: multiple SMSs related to a 'fishing campout' were sent to user E from Phone Contacts $411_2$ and multiple Facebook communications (message, wall post, event notice, poke, note, media uploads etc.) related to same 'fishing campout' were sent to user F from Facebook $411_5$.

Any other communication event that may relate (or hint of a relationship between) two or more recipients. Stated another way, information about a communication event that relates to multiple recipients.

Referring to FIG. 5, there is a flowchart of an exemplary method 500 that can be used to classify the communication event 214 per method 300's step 304 in accordance with an embodiment of the present invention. At step 502, the smart address book device 206 determines if the new communication event 214 is a multimedia session $214_1$, a web based real time communication session $214_2$, voice call $214_3$, a short message service $214_4$, an email $214_5$, or a social networking event $214_6$. If the new communication event 214 is the multimedia session $214_1$; the web based real time communication session $214_2$, the voice call $214_3$, or the short message service $214_4$, then the smart address book device 206 at step 504 provides this information as an input to the pattern mapping procedure 224. If the new communication event 214 is the email $214_5$, then the smart address book device 206 at step 506 determines if the email $214_5$ is a personal email $214_{5A}$ or a work-related email $214_{5B}$ and provides this information as an input to the pattern mapping procedure 224. If the new communication event 214 is the social networking event $214_6$, then the smart address book device 206 at step 508 determines a specific type of the social networking event $214_6$. For instance, the smart address book device 206 can determine whether the social networking event $214_6$ is a status update $214_{6A}$, an event notice $214_{6B}$, a notice for digital content sharing $214_{6C}$, a message $214_{6D}$, a note $214_{6E}$, a poke $214_{6F}$, or some other type of social networking event $214_{6G}$. At step 510, the smart address book device 206 determines if the specific type of the social networking event $214_6$ is of a professional nature $214_6^1$ or a personal nature $214_6^2$ and provides this information as an input to the pattern mapping procedure 224.

Referring to FIG. 6, there is a diagram illustrating various features of the smart address book device 206 in addition to a flowchart of an exemplary pattern mapping procedure 224 that can be implemented per method 300's step 306 in accordance with an embodiment of the present invention. To help explain the exemplary pattern mapping procedure 224, the diagram illustrates the database 216 within which there is stored the user's communication history 401 (FIG. 4A's step 402). The user's communication history 401 is stored in the database 216 for a specified period of time. The length of this time (i.e., how long the user's communication history 401 should be stored) is dependent on the physical memory limitation, capacity of the processor 218, and an efficiency of the search process of the smart address book device 206. The master contact list 222 is also stored in the database 216. In addition, the diagram illustrates where the exemplary pattern mapping procedure 224 receives the inputs from the communication event classification method 500 (FIG. 5's step 504) and information 600 such as the user's communication history 401 and the master contact list 222 from the database 216.

The exemplary pattern mapping procedure 224 receives information 600 (e.g., user's communication history 401, master contact list 222) from the database 216 and processes this information 600 to identify patterns between the classified new communication event 214 and the master contact list 222 and then creates/develops (step 601) the user contact list 226 of potential recipients $205_1, 205_2 \ldots 205_n$ which could be sent the new communication event 214. For instance, the exemplary pattern mapping procedure 224 can process the information 600 to create/develop the user contact list 226 (step 601) by performing one or more of the following steps:

Identify individuals who have been grouped together in multiple communications (step 602).
Consider if the new communication event 214 is professional-business related or personal related (step 604).
Consider the frequency of communications (step 606).
Identify the individuals who are in multiple social networking contact lists (e.g., both in Facebook $204_5$ and Twitter $204_6$. Facebook $204_5$ and LinkedIn $204_7$ etc.) (step 608).
Identify if the individuals who are in multiple forms of communication contact lists (e.g., in Facebook $204_5$ and phone calls $204_2$, in LinkedIn $204_7$ and SMS $204_1$ etc.) (step 610),
Consider if the individuals identified, in step 601 are always sent communications in single method of communication (e.g., only present in voice calls $204_2$, only present in SMS $204_1$, only present in social networking communications $204_5$, $204_6$, $204_7$, only present in emails $204_3$ and $204_4$ etc.) (step 612),
Evaluate the content of the new communication event 214 (e.g., subject, key words in the body of the message etc.) to find a possible relation to previous user approved contact lists (step 614).
Consider the number of times these individuals have been grouped together in the past (step 616).

Upon processing the content of the communication event 214 per steps 602, 604, 606 . . . 614 and creating/developing the user contact list 226 (step 601) through the exemplary pattern mapping procedure 224, the smart address book device 206 presents the user 203 with the user contact list 226 (suggested list of recipients $205_1, 205_2 \ldots 205_n$) for the new communication event 214 (FIG. 3's step 308). As specified earlier, the user 203 is allowed to change the list of recipients suggested in the user contact list 226 (FIG. 3's step 308). Thereafter, the smart address book device 206 receives the user approved contact list 228 and stores the user approved contact list 228 in the database 216 (FIG. 3's step 310). Finally, the smart address book device 206 sends the new communication event 214 using one or more of the communication applications $204_1$, $204_2$, $204_3$, $204_4$, $204_5$, $204_6$, $204_7 \ldots 204_n$ to the one or more recipients $205_1$ and $205_2$ (for example) within the user approved contact list 228 (FIG. 3's step 312). For instance, the smart address book device 206 could send the new communication event 214 using the Outlook email application $204_3$ to recipient $205_1$ and using the Facebook application $204_5$ to recipient $205_2$.

Figure 1:
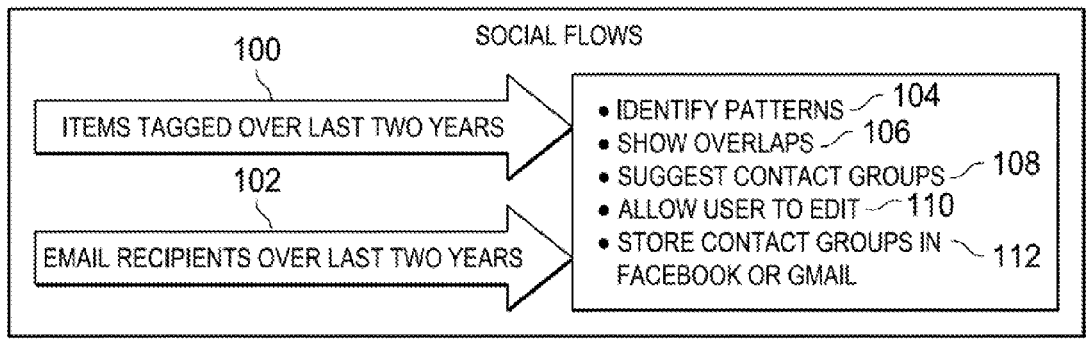
FIG. 1 (PRIOR ART) is a diagram which illustrates the basic concept of the traditional SocialFlows tool.
Figure 7:
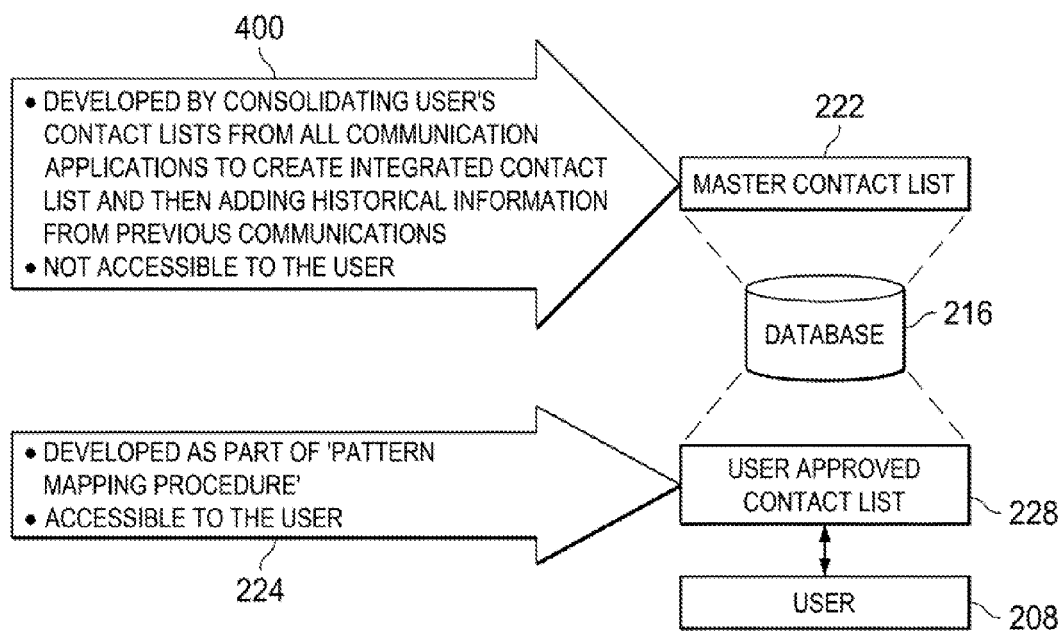
FIG. 7 is a diagram which shows the relationship between the master contact list and a user approved contact list.

Referring to FIG. 7, there is a diagram which shows the relationship between the master contact list 222 and the user approved contact list 228. As shown, the user approved contact list 228 is developed as part of the pattern mapping procedure 224 and is accessible to the user 203 (see FIG. 6). On the other hand, the master contact list 222 is venerated by consolidating the contact lists $411_1$, $411_2$, $411_3$, $411_4$, $411_5$, $411_6$, $411_7 \ldots 411_n$ from all of the communications applications $204_1$, $204_2$, $204_3$, $204_4$, $204_5$, $204_6$, $204_7 \ldots 204_n$ to create the integrated contact list 403 and then adding the selected historical information 405 from the past communication events 401 to the integrated contact list 403 (see FIGS. 4A-4B). The master contact list 222 is not accessible to the user 203. The smart address book device 206 updates the master contact list 222 as soon as the user 203 changes any of their contact lists $411_1$, $411_2$, $411_3$, $411_4$, $411_5$, $411_6$, $411_7 \ldots 411_n$ which are associated with their communications applications $204_1$, $204_2$, $204_3$, $204_4$, $204_5$, $204_6$, $204_7 \ldots 204_n$.

From the foregoing, one skilled in the art will readily appreciate that the telecommunication device 200 which incorporates the smart address book device 206 solves the problems of the traditional SocialFlows tool by improving how contact lists can be created. In addition, the smart address book device 206 solves another problem by controlling how a user 203 can communicate and send their message 214 to the people $205_1, 205_2 \ldots 205_n$ in these contact lists. The telecommunication device 200 accomplishes this by integrating all contact lists $411_1$, $411_2$, $411_3$, $411_4$, $411_5$, $411_6$, $411_7 \ldots 411_n$ associated with various communication applications $204_1$, $204_2, 204_3, 204_4, 204_5, 204_6, 204_7 \ldots 204_n$ while enabling the user 203 to communicate to a group of people $205_1, 205_2 \ldots 205_n$ that may span across his/her multiple contact lists $411_1, 411_2, 411_3, 411_4, 411_5, 411_6; 411_7 \ldots 411_n$. The telecommunication device 200 including the smart address book device 206 is a marked improvement over the traditional Social Flows tool and has several advantages some of which are as follows:

- The traditional SocialFlows tool only addresses a limited integration of the contact lists associated with Gmail and Facebook applications. In contrast, the telecommunication device 200 takes into account all of the contact lists $411_1, 411_2, 411_3, 411_4, 411_5, 411_6, 411_7 \ldots 411_n$, associated with communication applications $204_1, 204_2, 204_3, 204_4, 204_5, 204_6, 204_7 \ldots 204_n$ such as basic voice, SMS, business email (e.g. Outlook), professional networking portal such as LinkedIn etc.
- The traditional SocialFlows tool does not use the historical data 401 of the user's telephone (voice call, SMS etc) and business email (e.g., Outlook) communications to suggest various groups from the contact lists.
- The traditional SocialFlows does not suggest a group of people—developed from the user's multiple contact lists—as possible recipients while the user is in the process of developing communication content (email, social networking message etc.) or about to initiate a communication event (e.g. phone call, SMS etc.).
- The telecommunication device 200 allows the user 203 to communicate to a group of recipients $205_1, 205_2 \ldots 205_n$ that span across his/her multiple contact lists $411_1, 411_2, 411_3, 411_4, 411_5, 411_6, 411_7 \ldots 411_n$.
- The telecommunication device 200 enables the user 203 to receive a user contact list 226 (suggested list of recipients $205_1, 205_2 \ldots 205_n$) based on all of his/her all contact lists $411_1, 411_2, 411_3, 411_4, 411_5, 411_6, 411_7 \ldots 411_n$ and their past communication patterns 401. The telecommunication device 200 also allows the user to modify the suggested list of persons/groups.
- The telecommunication device 200 allows the operator to sell and distribute the smart address book device 206 to users that cover all forms of communication methods. The operator now will be able to mine this data for targeted advertising in the middle of the user's communication process—e.g., while the user is drafting a social networking message or after the user has sent an SMS. This technology makes the operators relevant by inserting themselves into the value chain of emerging multimedia based social networking communications. Currently, the operators are not able to participate in the lucrative advertisement based market segment exploited by OTT (Over The Top) service providers such as Google, Facebook, Netflix etc. This technology will allow the operators to be part of this social networking communication by providing a valuable communication capability—i.e., the Smart Address Book device—to the users.
- The telecommunication device 200 rather than have a dedicated smart book address device 206 could download an application or otherwise be programmed with software that enables the telecommunication device 200 and in particular a processor therein to perform the steps associated with method 300.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A telecommunication device used by a user to initiate communication events to one or more recipients, the telecommunication device comprising:
   a plurality of communication applications;
   a smart address book device comprising:
      a database;
      a processor; and
      a memory that stores processor-executable instructions where the processor interfaces with the memory and executes the processor-executable instructions to enable the following:
      create a master contact list;
      receive an indication that the user initiated a new communication event;
      classify the new communication event;
      run a pattern mapping procedure to identify patterns between the classified new communication event and the master contact list and then create a user contact list of potential recipients which could be sent the new communication event;
      present the user contact list to the user and allow the user to modify the user contact list and generate a user approved contract list of one or more recipients that are to be sent the new communication event;
      receive the user approved contact list; and
      send the new communication event using one or more of the communication applications to the one or more recipients within the user approved contact list.

2. The telecommunication device of claim 1, wherein the processor further executes the processor-executable instructions to create the master contact list as follows:
   collect a user communication history associated with the plurality of communication applications;
   store the collected user communication history in the database;
   create an integrated contact list by using the stored user communication history;
   add historical information retrieved from the stored user communication history to the integrated contact list to create the master contact list; and
   store the master contact list in the database.

3. The telecommunication device of claim 2, wherein the created integrated contact list comprises a contact list indicating one or more recipients who are only associated with one of the communication applications, one or more recipients who are associated with two of the communication applications, and one or more recipients who are associated with three of the communication applications.

4. The telecommunication device of claim 2, wherein the historical information includes information about a communication event that relates to multiple recipients.

5. The telecommunication device of claim 2, wherein the historical information includes at least one of the following:
   a list of recipients who are associated with different communication applications and have been addressed together in one or more communication events;
   a content of a similar nature which has been in multiple communication events that have been addressed to one or more recipients associated with one of the communication applications and to one or more recipients associated with another one of the communication applications; and a list of recipients from different user approved contact lists who have been part of similar communication events.

6. The telecommunication device of claim 1, wherein the user does not have access to the master contact list.

7. The telecommunication device of claim 1, wherein the processor executes the processor-executable instructions to classify the new communication event as follows:
    determining if the new communication event is a web based real time communication session, a multimedia session, a voice call, a short message service, an email, or a social networking event;
    if the new communication event is the email, then determine if the email is a personal email or a work-related email; and
    if the new communication event is the social networking event, then determine a specific type of the social networking event and then determine if the specific type of the social networking event is of a personal nature or a professional nature.

8. The telecommunication device of claim 7, wherein the specific type of the social networking event is one of the following: a status update, an event notice, a notice for digital content sharing, a message, a note, or a poke.

9. The telecommunication device of claim 1, wherein the processor executes the processor-executable instructions to run the pattern mapping procedure to identify patterns between the classified new communication event and the master contact list and then create the user contact list of potential recipients which could be sent the new communication event by performing one or more of following:
    identify individuals who have been grouped together in multiple communication events;
    consider if the new communication event is of a professional nature or a personal nature;
    consider a frequency of communications;
    identify individuals who are in multiple social networking contact lists c;
    identify individuals who are in multiple forms of communication contact lists;
    consider if individuals are always sent communication events using a single communication application
    evaluate a content of the new communication event to find a possible relation to previous user approved contact lists; and
    consider a number of times these individuals have been grouped together in past communication events.

10. A method implemented by a telecommunication device used by a user to initiate a communication event to one or more recipients, wherein the telecommunication device includes a plurality of communication applications, the method comprising the steps of:
    creating a master contact list;
    receiving an indication that the user initiated a new communication event;
    classifying the new communication event;
    running a pattern mapping procedure to identify patterns between the classified new communication event and the master contact list and then create a user contact list of potential recipients which could be sent the new communication event;
    presenting the user contact list to the user and allows the user to modify the user contact list and generate a user approved contract list of one or more recipients that are to be sent the new communication event;
    receiving the user approved contact list; and
    sending the new communication event using one or more of the communication applications to the one or more recipients within the user approved contact list.

11. The method of claim 10, wherein the creating step further comprises:
    collect a user communication history associated with the plurality of communication applications;
    store the collected user communication history in the database;
    create an integrated contact list by using the stored user communication history;
    add historical information retrieved from the stored user communication history to the integrated contact list to create the master contact list; and
    store the master contact list in the database.

12. The method of claim 11, wherein the created integrated contact list comprises a contact list indicating one or more recipients who are only associated with one of the communication applications, one or more recipients who are associated with two of the communication applications, and one or more recipients who are associated with three of the communication applications.

13. The method of claim 11, wherein the historical information includes information about a communication event that relates to multiple recipients.

14. The method of claim 11, wherein the historical information includes at least one of the following:
    a list of recipients who are associated with different communication applications and have been addressed together in one or more communication events;
    a content of a similar nature which has been in multiple communication events that have been addressed to one or more recipients associated with one of the communication applications and to one or more recipients associated with another one of the communication applications; and
    a list of recipients from different user approved contact lists who have been part of similar communication events.

15. The method of claim 10, wherein the user does not have access to the master contact list.

16. The method of claim 10, wherein the step of classifying the new communication event further comprises:
    determining if the new communication event is a web based real time communication session, a multimedia session, a voice call, a short message service, an email, or a social networking event;
    if the new communication event is the email, then determine if the email is a personal email or a work-related email; and
    if the new communication event is the social networking event, then determine a specific type of the social networking event and then determine if the specific type of the social networking event is of a personal nature or a professional nature.

17. The method of claim 16, wherein the specific type of the social networking event is one of the following: a status update, an event notice, a notice for digital content sharing, a message, a note, or a poke.

18. The method of claim 10, wherein the step of running the pattern mapping procedure to identify patterns between the classified new communication event and the master contact list and then create the user contact list of potential recipients which could be sent the new communication event further comprises one or more of the following steps:
    identify individuals who have been grouped together in multiple communication events;

consider if the new communication event is of a professional nature or a personal nature;
consider a frequency of communications;
identify individuals who are in multiple social networking contact lists;
identify individuals who are in multiple forms of communication contact lists;
consider if individuals are always sent communication events using a single communication application
evaluate a content of the new communication event to find a possible relation to previous user approved contact lists; and
consider a number of times these individuals have been grouped together in past communication events.

19. A smart address book device configured to interact with a plurality of communication applications and further configured to manage one or more contact lists for a user, the smart address book device comprising:
a database;
a processor; and
a memory that stores processor-executable instructions where the processor interfaces with the memory and executes the processor-executable instructions to enable the following:
create a master contact list;
receive an indication that the user initiated a new communication event;
classify the new communication event;
run a pattern mapping procedure to identify patterns between the classified new communication event and the master contact list and then create a user contact list of potential recipients which could be sent the new communication event;
present the user contact list to the user and allow the user to modify the user contact list and generate a user approved contract list of one or more recipients that are to be sent the new communication event;
receive the user approved contact list; and
send the new communication event using one or more of the communication applications to the one or more recipients within the user approved contact list.

20. The smart address book device of claim 19, wherein the processor further executes the processor-executable instructions to create the master contact list as follows:
collect a user communication history associated with the plurality of communication applications;
store the collected user communication history in the database;
create an integrated contact list by using the stored user communication history;
add historical information retrieved from the stored user communication history to the integrated contact list to create the master contact list; and
store the master contact list in the database.

21. The smart address book device of claim 19, wherein the processor executes the processor-executable instructions to classify the new communication event as follows:
determining if the new communication event is a web based real time communication session, a multimedia session, a voice call, a short message service, an email, or a social networking event;
if the new communication event is the email, then determine if the email is a personal email or a work-related email; and
if the new communication event is the social networking event, then determine a specific type of the social networking event and then determine if the specific type of the social networking event is of a personal nature or a professional nature.

22. The smart address book device of claim 19, wherein the processor executes the processor-executable instructions to run the pattern mapping procedure to identify patterns between the classified new communication event and the master contact list and then create the user contact list of potential recipients which could be sent the new communication event by performing one or more of following:
identify individuals who have been grouped together in multiple communication events;
consider if the new communication event is of a professional nature or a personal nature;
consider a frequency of communications;
identify individuals who are in multiple social networking contact lists;
identify individuals who are in multiple forms of communication contact lists;
consider if individuals are always sent communication events using a single communication application
evaluate a content of the new communication event to find a possible relation to previous user approved contact lists; and
consider a number of times these individuals have been grouped together in past communication events.

* * * * *

UNITED STATES PATENT AND TRADEMARK OFFICE
CERTIFICATE OF CORRECTION

PATENT NO. : 8,660,602 B2
APPLICATION NO. : 13/609884
DATED : February 25, 2014
INVENTOR(S) : Akhtar et al.

It is certified that error appears in the above-identified patent and that said Letters Patent is hereby corrected as shown below:

In the Specification

In Column 1, Line 16, delete "phone call." and insert -- phone call, --, therefor.

In Column 1, Line 19, delete "as user" and insert -- a user --, therefor.

In Column 1, Line 37, delete "Socialflows" and insert -- SocialFlows --, therefor.

In Column 2, Line 10, delete "comprises as" and insert -- comprises a --, therefor.

In Column 2, Line 35, delete "steps of" and insert -- steps of: --, therefor.

In Column 2, Line 63, delete "run it pattern" and insert -- run a pattern --, therefor.

In Column 2, Line 66, delete "list, of" and insert -- list of --, therefor.

In Column 3, Line 3, delete "event" and insert -- event; --, therefor.

In Column 4, Line 5, delete "devices" and insert -- device's --, therefor.

In Column 4, Line 44, delete "described, in" and insert -- described in --, therefor.

In Column 4, Lines 53-54, delete "processor-executable," and insert -- processor-executable --, therefor.

In Column 5, Line 5, delete "(see." and insert -- (see --, therefor.

In Column 5, Line 35, delete "406" and insert -- 406, --, therefor.

In Column 5, Line 56, delete "Linker" and insert -- LinkedIn --, therefor.

In Column 7, Line 3, delete "$214_1$;" and insert -- $214_1$, --, therefor.

Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,660,602 B2

In Column 8, Line 4, delete "610)," and insert -- 610). --, therefor.

In Column 8, Line 10, delete "612)," and insert -- 612). --, therefor.

In Column 8, Line 43, delete "venerated" and insert -- generated --, therefor.

In Column 9, Line 36, delete "and their" and insert -- and on their --, therefor.

In the Claims

In Column 11, Line 39, in Claim 9, delete "lists c;" and insert -- lists; --, therefor.

In Column 11, Line 43, in Claim 9, delete "application" and insert -- application; --, therefor.

In Column 13, Line 9, in Claim 18, delete "application" and insert -- application; --, therefor.

In Column 14, Line 40, in Claim 22, delete "application" and insert -- application; --, therefor.